US011733696B2

(12) United States Patent
Yang et al.

(10) Patent No.: US 11,733,696 B2
(45) Date of Patent: Aug. 22, 2023

(54) DETECTING LOOPS FOR AUTONOMOUS VEHICLES

(71) Applicant: Waymo LLC, Mountain View, CA (US)

(72) Inventors: Carl Yang, Sunnyvale, CA (US); Jialiu Lin, Union City, CA (US); Austin Abrams, Redwood City, CA (US); Vishay Nihalani, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 505 days.

(21) Appl. No.: 16/932,016

(22) Filed: Jul. 17, 2020

(65) Prior Publication Data

US 2022/0019220 A1    Jan. 20, 2022

(51) Int. Cl.
*G05D 1/00* (2006.01)
*G05D 1/02* (2020.01)

(52) U.S. Cl.
CPC ......... *G05D 1/0061* (2013.01); *G05D 1/0214* (2013.01); *G05D 1/0278* (2013.01); *G05D 1/0282* (2013.01)

(58) Field of Classification Search
CPC .. G05D 1/0061; G05D 1/0214; G05D 1/0278; G05D 1/0282
See application file for complete search history.

(56) References Cited

U.S. PATENT DOCUMENTS

| 2016/0123756 A1* | 5/2016 | Becker .............. G01C 21/3453 |
|---|---|---|
| | | 701/533 |
| 2017/0248963 A1 | 8/2017 | Levinson et al. |
| 2019/0113916 A1 | 4/2019 | Guo et al. |
| 2020/0018609 A1 | 1/2020 | Nagy et al. |

FOREIGN PATENT DOCUMENTS

| CN | 110849367 A | * | 2/2020 | ........... G01C 21/206 |
|---|---|---|---|---|
| JP | H08240437 A | * | 9/1996 | |
| JP | 2018132414 A | * | 8/2018 | |

OTHER PUBLICATIONS

English translation of CN-110849367-A.*
English translation of JP-2018132414-A.*
English translation of JP H08240437 A.*

* cited by examiner

*Primary Examiner* — Anshul Sood
*Assistant Examiner* — Matthew Ho
(74) *Attorney, Agent, or Firm* — Botos Churchill IP Law LLP

(57) ABSTRACT

Aspects of the disclosure provide for determining whether a vehicle is in a loop for an autonomous vehicle. For instance, a route from a current location of the vehicle to a destination for a trip may be generated. Locations traversed by the vehicle during the trip may be tracked. Locations of the route may be compared to the tracked locations to determine an overlap value. Whether the vehicle is in a loop may be determined based on the overlap value.

21 Claims, 12 Drawing Sheets

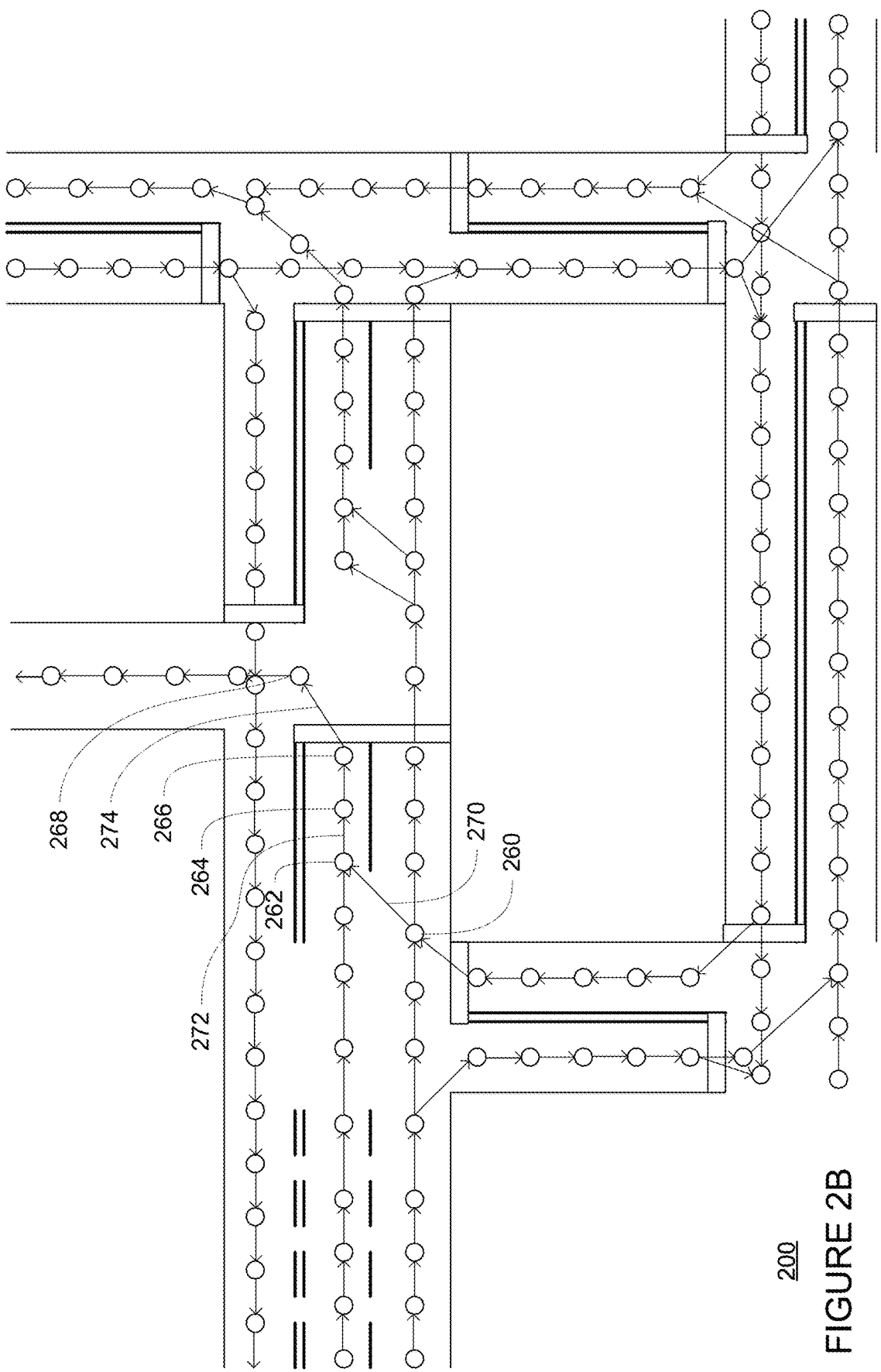

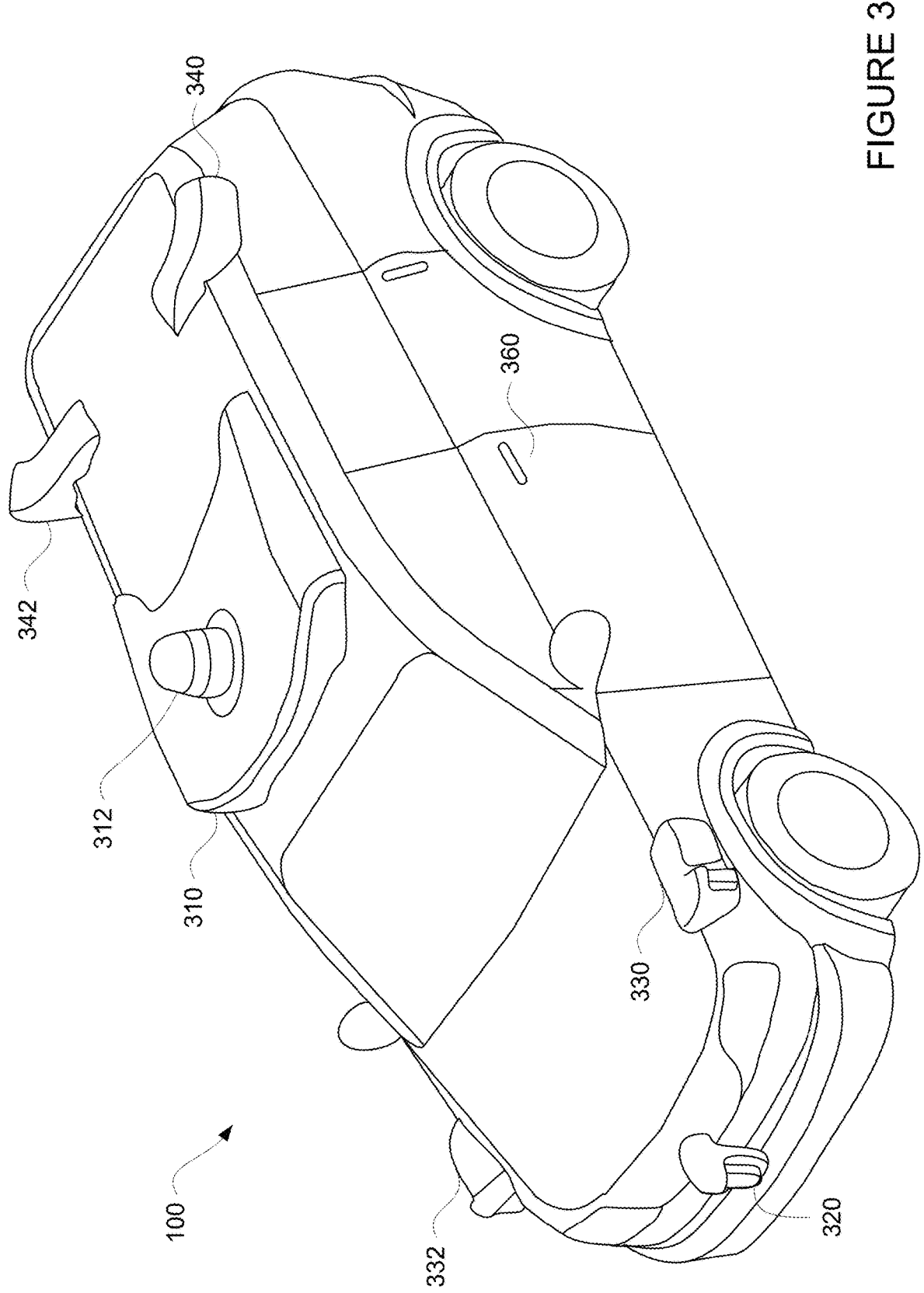

DETECTING LOOPS FOR AUTONOMOUS VEHICLES

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location. Autonomous vehicles are equipped with various types of sensors in order to detect objects in the surroundings. For example, autonomous vehicles may include sonar, radar, camera, LIDAR, and other devices that scan and record data from the vehicle's surroundings.

In some instances, autonomous vehicles may become engaged in a loop which leaves the vehicle unable to execute a planned route to a destination. For example, a vehicle may travel along the same portion of roadway (e.g. around the block or around a circle) multiple times. In some instances, these loops can become infinite, such that the vehicle remains in the loop without being able to reach its destination. Such loop may be caused for example, by a failed pullover attempt, missed turn, missed lane change, a blockage of a planned route (e.g. by an emergency or other vehicle, debris, road closure, etc.), planning system software choosing not to execute the route provided by routing module (e.g. a planned trajectory does not include a lane change in the route or there is some other software issue), etc. and can result in a waste of time and resources and can also lead to a poor user experience for any passengers.

BRIEF SUMMARY

Aspects of the disclosure provide a method for determining whether a vehicle is in a loop for an autonomous vehicle. The method includes generating, by one or more processors, a route from a current location of the vehicle to a destination for a trip; tracking, by the one or more processors, locations traversed by the vehicle during the trip; comparing, by the one or more processors, locations of the route to the tracked locations to determine an overlap value; and determining, by the one or more processors, whether the vehicle is in a loop based on the overlap value.

In one example, generating the route includes using a roadgraph including a nodes representing locations and edges representing connections between nodes, the tracked locations include a first plurality of nodes of the roadgraph, the locations of the route include a second plurality of nodes of the roadgraph, and the overlap value identifies a number of nodes that overlap between the first plurality of nodes and the second plurality of nodes. In this example, the comparing includes comparing the number of nodes that overlap to a threshold value. In another example, generating the route includes using a roadgraph including a nodes representing locations and a edges representing connections between nodes, and the tracked locations include a first plurality of edges of the roadgraph, the locations of the route include a second plurality of edges of the roadgraph, and the overlap value identifies a number of edges that overlap between the first plurality of edges and the second plurality of edges. In this example, the comparing includes comparing the number of edges that overlap to a threshold value. In another example, the tracking for the trip begins in response to setting a new destination for the vehicle. In another example, the tracking for the trip begins in response to a transition between a manual driving mode and an autonomous driving mode for the vehicle. In another example, the method also includes, when the vehicle is determined to be in a loop, determining a mitigation response. In one alternative, determining the mitigation response is based on whether the vehicle is within a predetermined distance from the destination. In addition or alternatively, the mitigation response includes connecting the vehicle with a remote assistance operator. In addition or alternatively, the mitigation response includes setting a new destination for the vehicle. In this example, the new destination is a current location of the vehicle. In an alternative, the mitigation response includes increasing costs of overlapping locations between the tracked locations and the locations of the route and computing a new route to the destination using the increased costs. In another alternative, generating the route includes using a roadgraph including a nodes representing locations and edges representing connections between nodes, and the tracked locations include a first plurality of edges of the roadgraph, the locations of the route include a second plurality of edges of the roadgraph, and comparing the locations of the route to the tracked location includes identifying a set of overlapping edges between the first plurality of edges and the second plurality of edges. In this example, the method also includes increasing costs of the set of overlapping edges and computing a new route to the destination using the increased costs. In addition, the method also includes determining whether the vehicle is able to exit the loop by determining an overlap between the new route and the set of overlapping edges. In this example, the method also includes when the vehicle is determined not to be able to exit the loop, further increasing costs of the set of overlapping edges and computing another new route to the destination using the further increased costs. In addition or alternatively, the vehicle is determined not to be able to exit the loop, sending a request for remote assistance. In another alternatively, generating the route includes using a roadgraph including a nodes representing locations and edges representing connections between nodes, and the tracked locations include a first plurality of nodes of the roadgraph, the locations of the route include a second plurality of nodes of the roadgraph, and comparing the locations of the route to the tracked location includes identifying a set of overlapping nodes between the first plurality of nodes and the second plurality of nodes. In this example, the method also includes increasing costs of the set of overlapping nodes and computing a new route to the destination using the increased costs. In addition, the method also includes determining whether the vehicle is able to exit the loop by determining an overlap between the new route and the set of overlapping nodes. In addition, the method also includes when the vehicle is determined not to be able to exit the loop, further increasing costs of the set of overlapping nodes and computing another new route to the destination using the further increased costs. Alternatively, the method also includes, when the vehicle is determined not to be able to exit the loop, sending a request for remote assistance.

BRIEF DESCRIPTION OF THE DRAWINGS

FIGS. 2A-2B are an example of map information in accordance with aspects of the disclosure.

FIG. 3 is an example external view of a vehicle in accordance with aspects of the disclosure.

DETAILED DESCRIPTION

Overview

Figure 1:
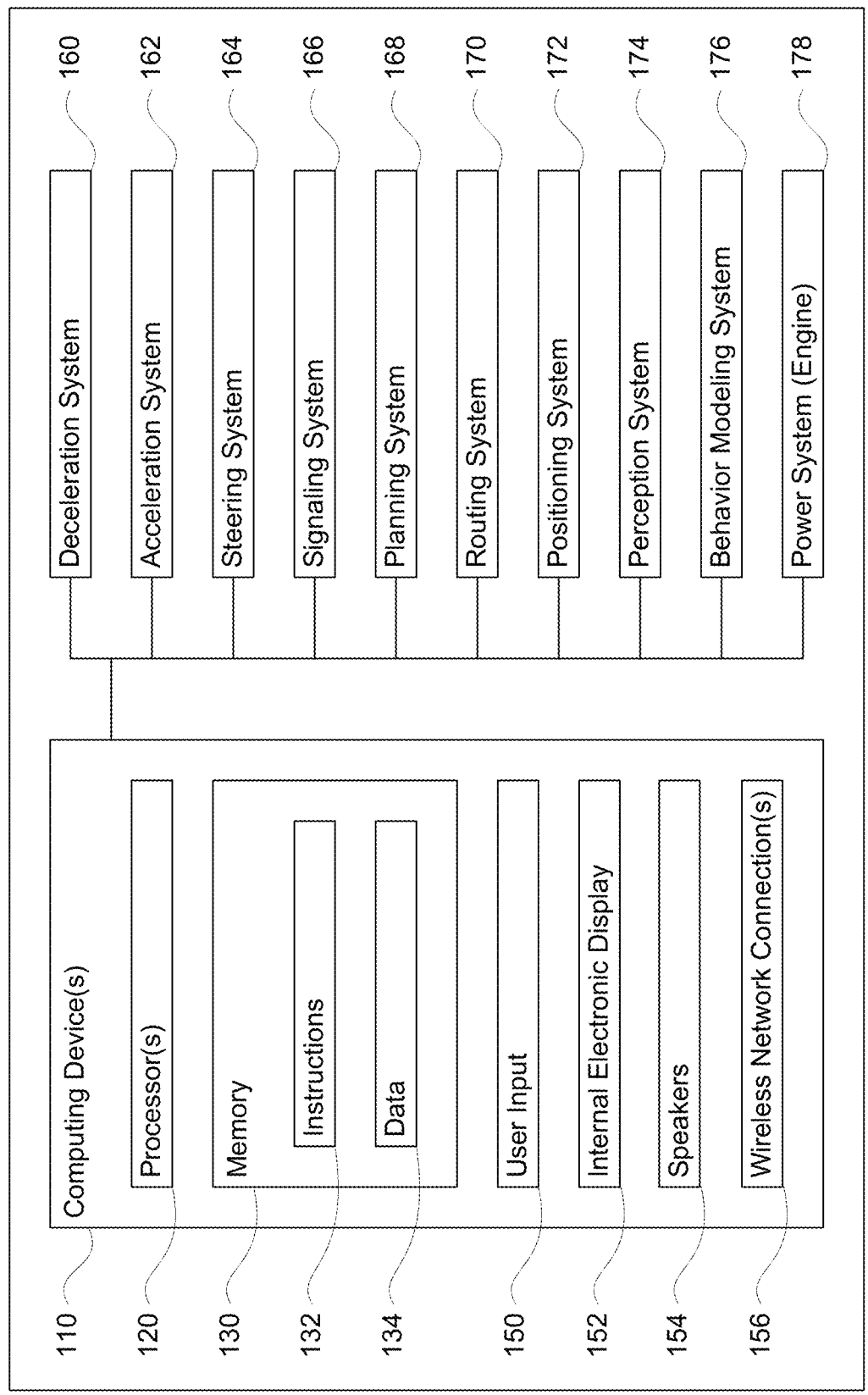
FIG. 1 is a functional diagram of an example vehicle in accordance with an exemplary embodiment.

The technology relates to detecting when an autonomous vehicle is engaged in a loop which leaves the vehicle unable to execute a planned route to a destination. As noted above some instances, these loops can become infinite, such that the vehicle remains in the loop without being able to reach its destination. Such loop may be caused for example, by a failed pullover attempt, missed turn, missed lane change, a blockage of a planned route (e.g. by an emergency or other vehicle, debris, road closure, etc.), a planning system choosing not to execute the route provided by routing module (e.g. a planned trajectory does not include a lane change in the route or there is some other software issue), etc. and can result in a waste of time and resources and can also lead to a poor user experience for any passengers. In order to mitigate the effect of loops, the vehicles must be able to detect them. In order to do so, a routing system of the vehicle may determine an overlap between the "planned route" and "route history".

An autonomous vehicle may utilize map information including roadgraph when determining a route and planning trajectories for the vehicle to follow. For instance, the road graph may include a plurality of nodes representing locations in lanes which are connected by edges. The nodes may be located at fixed or variable distances. The edges may represent driving along the same lane or changing lanes. Each node and edge may have a unique identifier.

The vehicle's routing system may use the roadgraph to determine a route from a current location to a destination. Routes may be generated using a cost-based analysis which attempts to select a route to the destination with the lowest cost. Each route may include a plurality of nodes and edges which the vehicle can use to reach the destination. Routes may be recomputed periodically as the vehicle travels to the destination.

When a new trip is started, the routing system may track the nodes and edges which the vehicle has followed during the trip. These nodes and edges may make up a route history for a trip. A new trip may be started, for example, when a passenger is picked up, a new destination is set for the vehicle, or after a transition between driving modes, such as from a manual driving mode to an autonomous driving mode.

Each time the routing system publishes a new route, the nodes and edges of that new route may be compared to the nodes and edges of the route history. In this regard, the routing system may perform an iterative search comparing the nodes and edges of the new route to those of the route history in order to identify which nodes and edges overlap or are the same. In this regard, the routing system may identify a number of overlapping nodes and/or a number of overlapping edges for each new route. In some instances, the edges may give a stronger more accurate signal than the nodes themselves, but nodes may also be used.

The number of overlapping nodes and/or the number of overlapping edges may be compared to one or more threshold values. This comparison may be used to determine whether the amount of overlap is a meaningful one that suggests that the vehicle is in a loop. If the vehicle is determined to be within a loop, a mitigation response may be initiated. The mitigation response may depend upon where the vehicle is relative to its destination.

The features described herein may provide for a useful and practical approach to detecting and responding to loops. By detecting loops as described herein, they can be resolved, providing for a smoother trip which avoids wasting resources and improves the user experience.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., a mouse, keyboard, touch screen and/or microphone), various electronic displays (e.g., a monitor having a screen or any other electrical device that is operable to display information), and speakers 154 to provide information to a passenger of the vehicle 100 as needed. For example, electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The autonomous control system 176 may include various computing devices, configured similarly to computing devices 110, capable of communicating with various components of the vehicle in order to control the vehicle in an autonomous driving mode. For example, returning to FIG. 1, the autonomous control system 176 may be in communication with various systems of vehicle 100, such as deceleration system 160, acceleration system 162, steering system 164, routing system 166, planning system 168, positioning system 170, and perception system 172 in order to control the movement, speed, etc. of vehicle 100 in accordance with the instructions 134 of memory 130 in the autonomous driving mode.

As an example, a computing device of the autonomous control system 176 may interact with deceleration system 160 and acceleration system 162 in order to control the speed of the vehicle. Similarly, steering system 164 may be used by autonomous control system 176 in order to control the direction of vehicle 100. For example, if vehicle 100 is configured for use on a road, such as a car or truck, the steering system may include components to control the angle of wheels to turn the vehicle. The autonomous control system 176 may also use the signaling system in order to signal the vehicle's intent to other drivers or vehicles, for example, by lighting turn signals or brake lights when needed.

Routing system 166 may be used by the autonomous control system 176 in order to generate a route to a destination. Planning system 168 may be used by computing device 110 in order to follow the route. In this regard, the planning system 168 and/or routing system 166 may store detailed map information, e.g., highly detailed maps identifying a road network including the shape and elevation of roadways, lane lines, intersections, crosswalks, speed limits, traffic signals, buildings, signs, real time traffic information, pullover spots, vegetation, or other such objects and information.

Figure 2A:
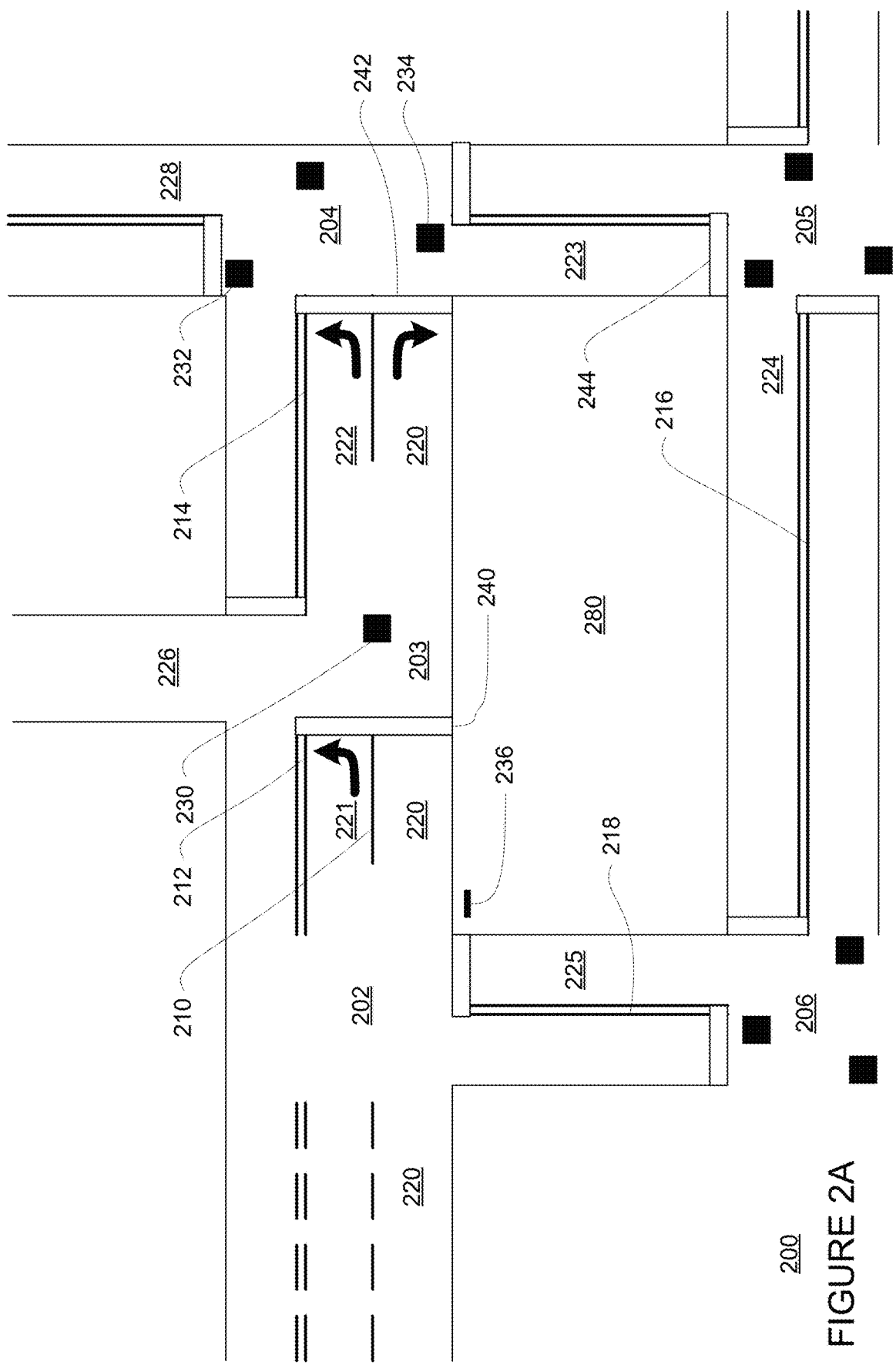

FIGS. 2A and 2B are an example of map information 200 for a small section of roadway including intersections 202, 203, 204, 205, 206. FIG. 2A depicts a portion of the map information 200 that includes information identifying the shape, location, and other characteristics of lane markers or lane lines 210, 212, 214, 216, 218, lanes 220, 221, 222, 223, 224, 225, 226, 227, 228, traffic control devices including traffic signal lights 230, 232, 234 and stop sign 236 (not depicted in FIG. 2B for clarity), stop lines 240, 242, 244, as well as a non-drivable area 280 (where the vehicles of the fleet are not able, permitted or simply supposed to drive). In this example, lane 221 approaching intersection 204 is a left turn only lane, lane 222 approaching intersection 206 is a left turn only lane, and lane 226 is a one-way street where the direction of traffic moves away from intersection 204. In addition to the aforementioned features, the map information may also include information that identifies the direction of traffic for each lane as well as information that allows the computing devices 110 to determine whether the vehicle has the right of way to complete a particular maneuver (i.e. complete a turn or cross a lane of traffic or intersection).

Although the map information is depicted herein as an image-based map, the map information need not be entirely image based (for example, raster). For instance, the map information may include one or more roadgraphs, graph networks or road networks of information such as roads, lanes, intersections, and the connections between these features which may be represented by road segments. Each feature in the map may also be stored as graph data and may be associated with information such as a geographic location and whether or not it is linked to other related features, for example, a stop sign may be linked to a road and an intersection, etc. In some examples, the associated data may include grid-based indices of a road network to allow for efficient lookup of certain road network features.

In this regard, in addition to the aforementioned physical feature information, the map information may include a plurality of graph nodes and edges representing road or lane segments that together make up the road network of the map information. Each edge is defined by a starting graph node having a specific geographic location (e.g. latitude, longitude, altitude, etc.), an ending graph node having a specific geographic location (e.g. latitude, longitude, altitude, etc.), and a direction. This direction may refer to a direction the vehicle 100 must be moving in in order to follow the edge (i.e. a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes.

For instance, FIG. 2B depicts most of the map information of FIG. 2A with the addition of a plurality of edges represented by arrows and graph nodes (depicted as circles) corresponding to the road network of map information 200. Though many edges and graph nodes are depicted, only a few are referenced for clarity and simplicity. For example, FIG. 2B includes edges 270, 272, 274 arranged between pairs of starting and ending graph nodes as graph nodes 260, 262, 264, 266. As can be seen, graph nodes 260 represents a starting point for edge 270, and graph nodes 262 represents an ending point for edge 270. Similarly, graph node 262 represents a starting point for edge 272, and graph node 264 represents an ending point for edge 272. In addition, graph node 266 represents a starting point for edge 274, and graph node 268 represents an ending point for edge 274. Again, the direction of each of these graph nodes is represented by the arrow of the edge. Edge 270 may represent a path a vehicle can follow to change from lane 220 to lane 221, edge 272 may represent a path that a vehicle can follow within lane 220, and edge 274 may represent a path a vehicle can follow to make a left turn at intersection 203 in order to move from lane 221 to lane 226. Although not shown, each of these edges may be associated with an identifier, for instance, a numeric value corresponding to a relative or actual location of the edge or simply the locations of the starting and ending graph nodes. In this regard, edges and graph nodes may be used to determine how to route and plan routes and trajectories between locations, change lanes and make other maneuvers, though in operation, the vehicle 100 need not follow the nodes and edges exactly.

The routing system 166 may use the roadgraph to determine a route from a current location (e.g. a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the vehicle, etc. Each route may include a list of a plurality of nodes and edges which the vehicle can use to reach the destination. Routes may be recomputed periodically as the vehicle travels to the destination.

Positioning system 170 may be used by autonomous control system 176 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of the roadgraph as well as relative location information, such as location relative to other cars immediately around it which can often be determined with less noise that absolute geographical location.

The positioning system 170 may also include other devices in communication with the computing devices autonomous control system 176, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by the computing devices of the autonomous control system 176. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

The autonomous control system 176 may be capable of communicating with various components of the vehicle in order to control the movement of vehicle 100 according to primary vehicle control code of memory of the autonomous control system 176. For example, returning to FIG. 1, the autonomous control system 176 may include various computing devices in communication with various systems of vehicle 100, such as deceleration system 160, acceleration system 162, steering system 164, routing system 166, planning system 168, positioning system 170, perception system 172, and power system 178 (i.e. the vehicle's engine or motor) in order to control the movement, speed, etc. of vehicle 100 in accordance with the instructions 134 of memory 130.

The various systems of the vehicle may function using autonomous vehicle control software in order to determine how to and to control the vehicle. As an example, a perception system software module of the perception system 172 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module which uses various behavior models based on object type to output a predicted future behavior for a detected object. In other instances, the characteristics may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may uses various models to output a likelihood of a construction zone or an object being an emergency vehicle. Detected objects, predicted future behaviors, various likelihoods from detection system software modules, the map information identifying the vehicle's environment, position information from the positioning system 170 identifying the location and orientation of the vehicle, a destination location or node for the vehicle as well as feedback from various other systems of the vehicle may be input into a planning system software module of the planning system 168. The planning system 168 may use this input to generate trajectories for the vehicle to follow for some brief period of time into the future based on a route generated by a routing module of the routing system 166. In this regard, the trajectories may define the specific characteristics of acceleration, deceleration, speed, etc. to allow the vehicle to follow the route towards reaching a destination. A control system software module of the autonomous control system 176 may be configured to control movement of the vehicle, for instance by controlling braking, acceleration and steering of the vehicle, in order to follow a trajectory.

The autonomous control system 176 may control the vehicle in an autonomous driving mode by controlling various components. For instance, by way of example, the autonomous control system 176 may navigate the vehicle to a destination location completely autonomously using data from the detailed map information and planning system 168. The autonomous control system 176 may use the positioning system 170 to determine the vehicle's location and perception system 172 to detect and respond to objects when needed to reach the location safely. Again, in order to do so, computing device 110 and/or planning system 168 may generate trajectories and cause the vehicle to follow these trajectories, for instance, by causing the vehicle to accelerate (e.g., by supplying fuel or other energy to the engine or power system 174 by acceleration system 162), decelerate (e.g., by decreasing the fuel supplied to the engine or power system 174, changing gears, and/or by applying brakes by deceleration system 160), change direction (e.g., by turning the front or rear wheels of vehicle 100 by steering system 164), and signal such changes (e.g., by lighting turn signals). Thus, the acceleration system 162 and deceleration system 160 may be a part of a drivetrain that includes various components between an engine of the vehicle and the wheels of the vehicle. Again, by controlling these systems, autonomous control system 176 may also control the drivetrain of the vehicle in order to maneuver the vehicle autonomously.

Figure 4:
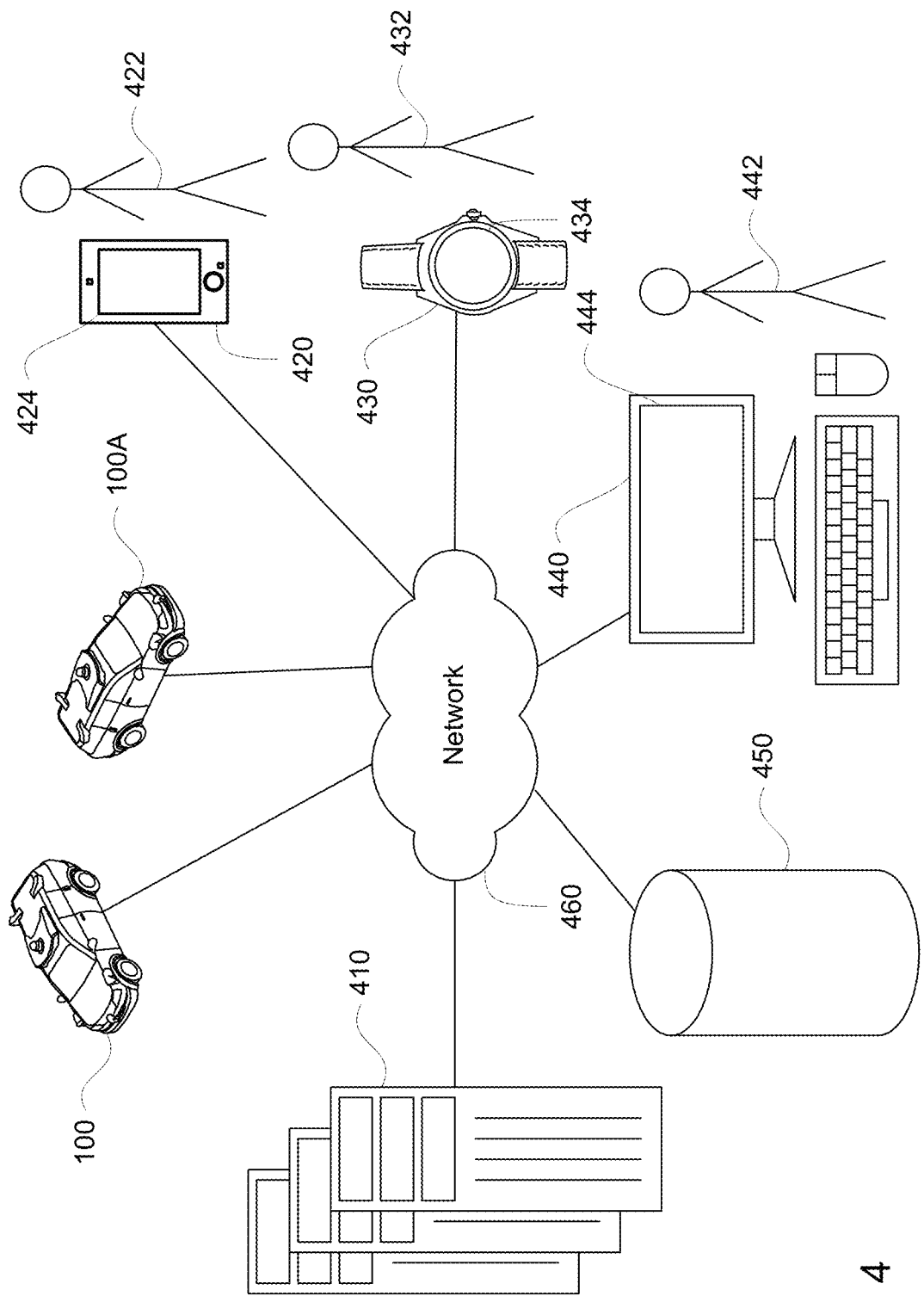
FIG. 4 is a pictorial diagram of an example system in accordance with aspects of the disclosure.
Figure 5:
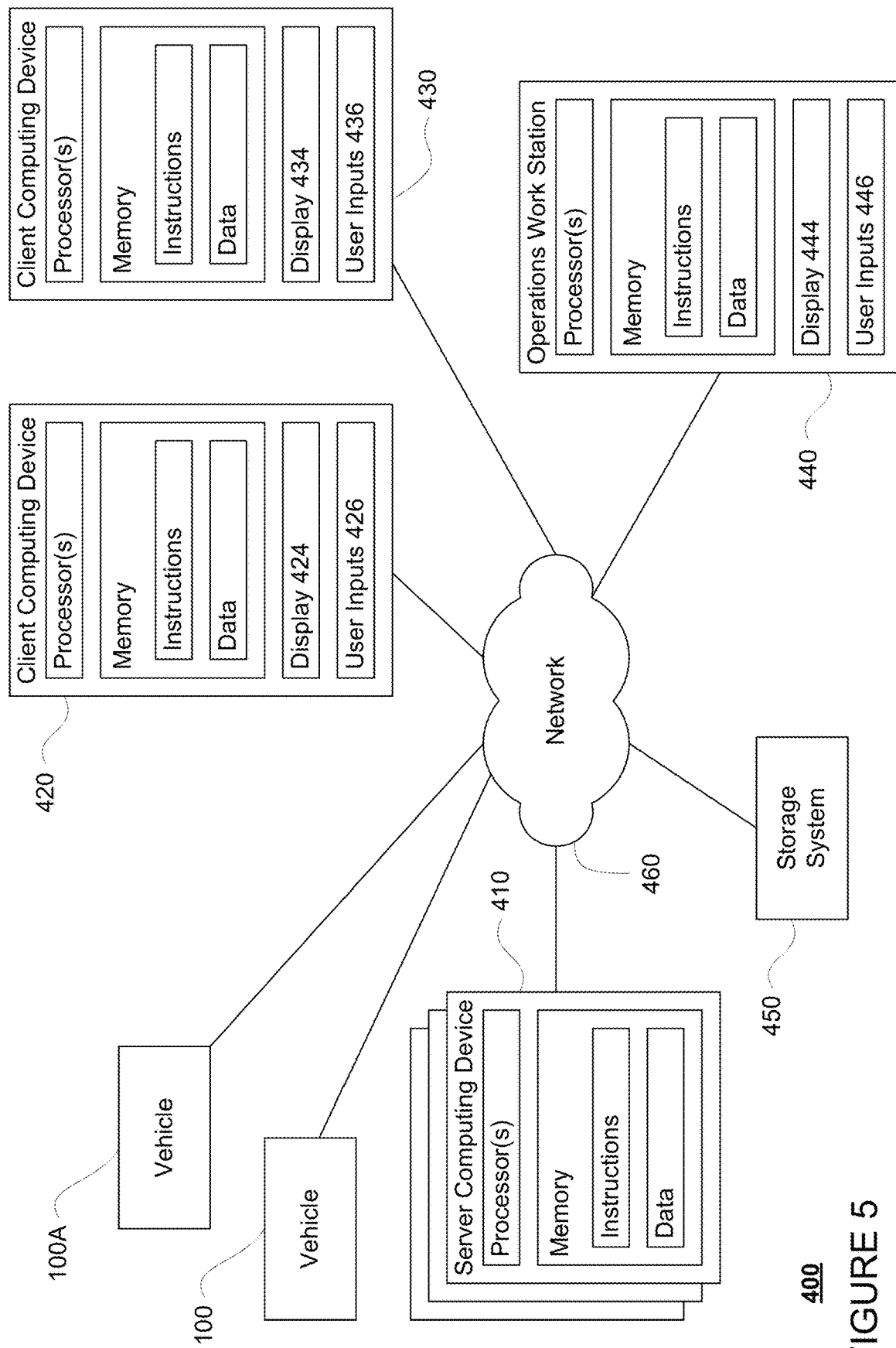
FIG. 5 is a functional diagram of the system of FIG. 4 in accordance with aspects of the disclosure.

Computing device 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100 and vehicle 100A, which may be configured the same as or similarly to vehicle 100. Although only a few vehicles and computing devices are depicted for simplicity, a typical system may include significantly more.

As shown in FIG. 5, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening graph nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A as well as computing devices 420, 430, 440 via the network 460. For example, vehicles 100, 100A, may be a part of a fleet of vehicles that can be dispatched by server computing devices to various locations. In this regard, the server computing devices 410 may function as a dispatching server computing system which can be used to dispatch vehicles such as vehicle 100 and vehicle 100A to different locations in order to pick up and drop off passengers. In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 5, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 4. As an example the user may input information using a small keyboard, a keypad, microphone, using visual signals with a camera, or a touch screen.

In some examples, client computing device 420 may be a mobile phone used by passenger of a vehicle. In other words, user 422 may represent a passenger. In addition, client communication device 430 may represent a smart watch for a passenger of a vehicle. In other words, user 432 may represent a passenger. The client communication device 440 may represent a workstation for an operations person, for example, a remote assistance operator or someone who may provide remote assistance to a vehicle and/or a passenger. In other words, user 442 may represent a remote assistance operator. Although only a few passengers and operations person are shown in FIGS. 4 and 5, any number of such, passengers and remote assistance operators (as well as their respective client computing devices) may be included in a typical system.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 11:
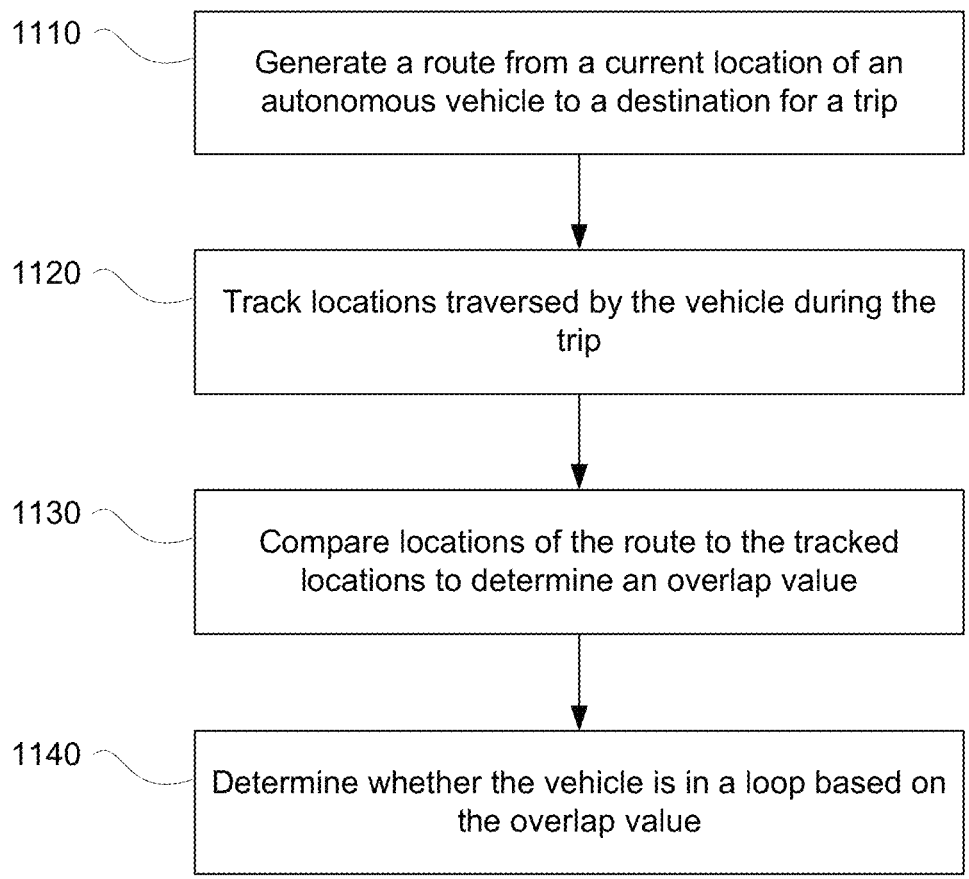
FIG. 11 is an example flow diagram in accordance with aspects of the disclosure.

FIG. 11 provides an example flow diagram 1100 for determining whether a vehicle is in a loop for an autonomous vehicle which may be performed by one or more processors of one or more computing devices such as the processors 120 of computing devices 110. At block 1110, a route from a current location of the vehicle to a destination for the trip is generated. For instance, an autonomous vehicle, such as vehicle 100, may utilize a roadgraph when determining a route and planning trajectories for the vehicle to follow. The routing system 166 may use the roadgraph to determine a route from a current location (e.g. a location of a current node) to a destination (or destination node). Each route may include a plurality of nodes and edges which the vehicle can use to reach the destination. As noted above, the routing system 166 may periodically recompute and/or update the route as the vehicle travels to the destination.

Figure 6:
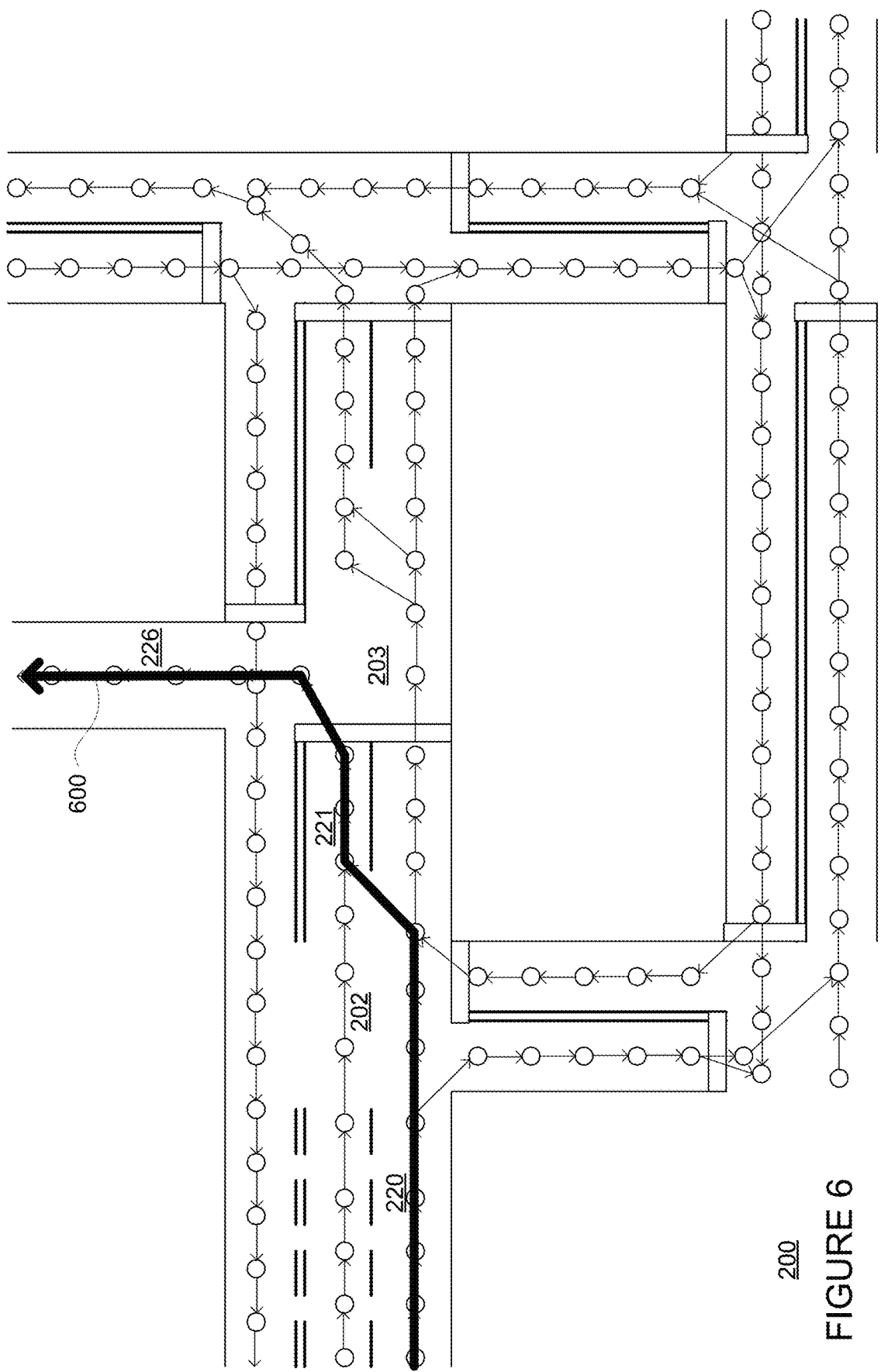
FIG. 6 is an example of a portion of a route and map information in accordance with aspects of the disclosure.
Figure 7:
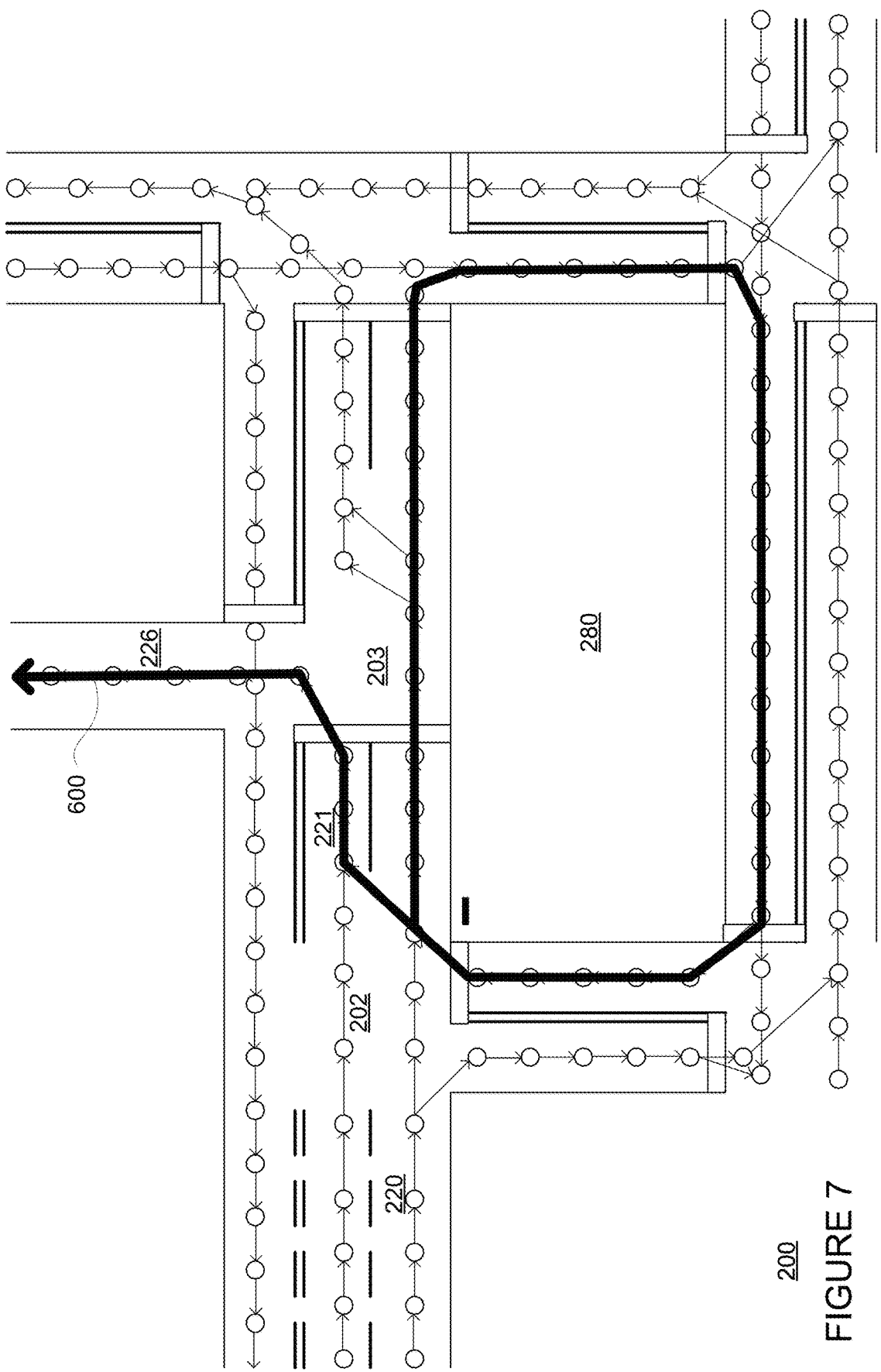
FIG. 7 is another example of a portion of a route and map information in accordance with aspects of the disclosure.

FIG. 6 is an example of a portion of a route 600 that vehicle 100 may follow from lane 220, though intersection 202, change from lane 220 to lane 221, and make a left at intersection 203 into lane 226. The route 600 identifies a list of nodes and edges that the vehicle may follow to reach a destination (not shown) from a current location of the vehicle (also not shown). However, in this example, it may be difficult for the vehicle 100 to change lanes from lane 220 to lane 221, because of the configuration of these lanes, traffic conditions (e.g. other vehicles preventing the lane changes), etc. Turning to FIG. 7, as noted above, the route may be updated periodically. In this regard, once the vehicle misses the lane change from lane 220 to lane 221, a new route 700 (only a portion of the new route 700 being depicted in FIG. 7) may cause the vehicle to travel around area 280 in order to attempt to make a left turn at intersection 203 again. However, if the vehicle 100 is unable to make the lane change from lane 220 to lane 221 by following the edge 270 between nodes 260 and 262 because of the configuration of these lanes, traffic conditions (e.g. other vehicles preventing the lane changes), etc., once the vehicle misses the lane change from lane 220 to lane 221, a new route 700 may cause the vehicle to travel around area 280 in order to attempt to make a left turn at intersection 203 again. In such a situation, the vehicle 100 may never be able to make the lane change, and thus, the vehicle 100 may end up in an essentially infinite loop around area 280.

Figure 8:
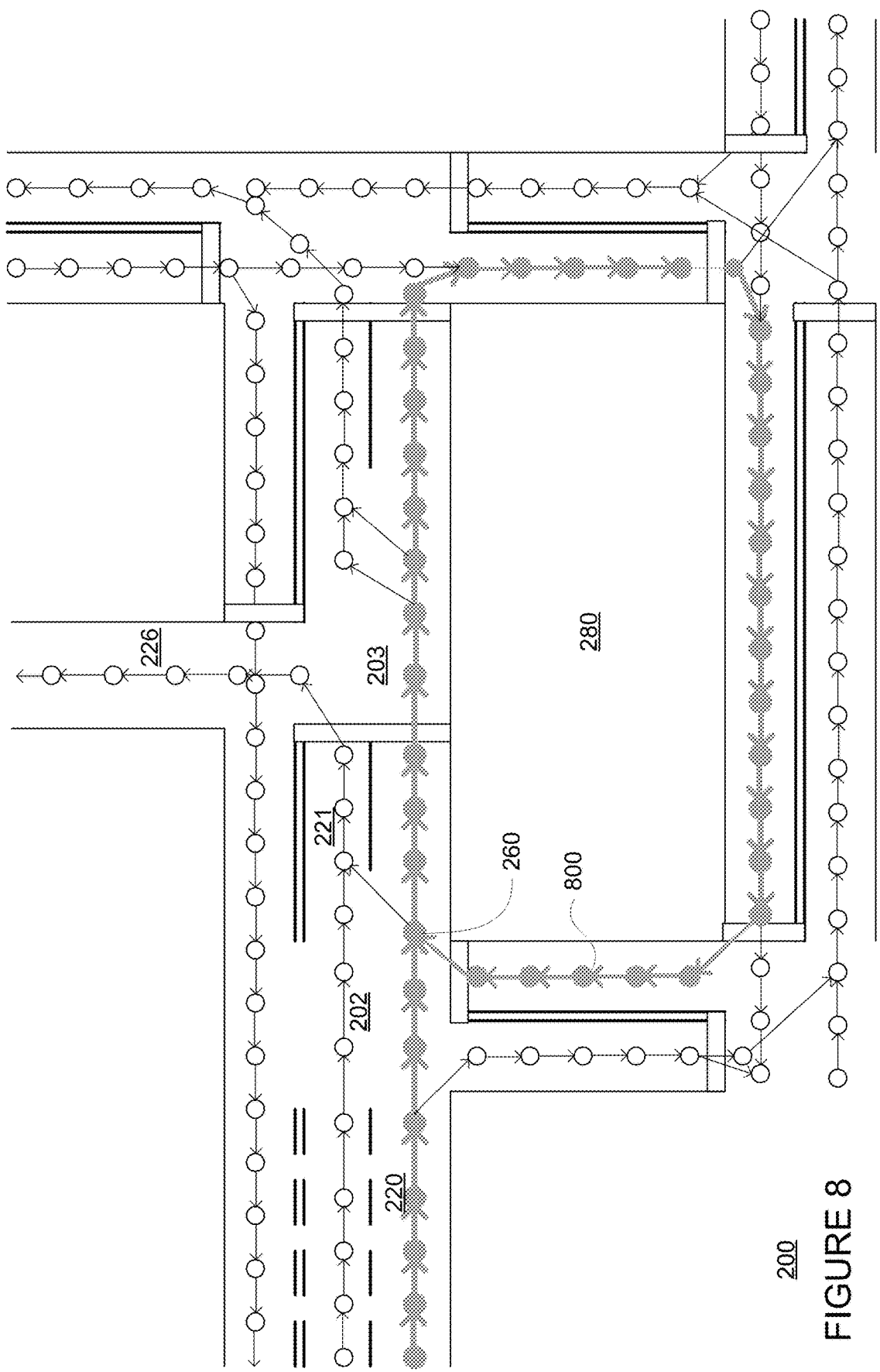
FIG. 8 is an example representation of a tracked list of nodes and edges and map information in accordance with aspects of the disclosure.

Returning to FIG. 11, at block 1120, locations traversed by the vehicle during a trip are tracked. When a new trip is started, the routing system may track the nodes and edges which the vehicle has followed during the trip. For instance, the routing system 166 may store a list of identifiers for the nodes and edges that have been traversed by the vehicle 100. These nodes and edges may make up a route history for a trip. A new trip may be started, for example, when a passenger is picked up, a new destination is set for the vehicle, or after a transition between driving modes, such as from a manual driving mode to an autonomous driving mode. FIG. 8 represents a tracked list of nodes and edges 800 that vehicle 100 has traversed where the lane change between lane 220 and 221a has been missed a second time during the same trip depicted in gray. In this example, once the vehicle 100 reaches the location of node 260 and the connected edge (both depicted in black), the routing system 166 may reroute the vehicle around the area 280 again such that the vehicle 100 would again follow route 700.

Figure 9:
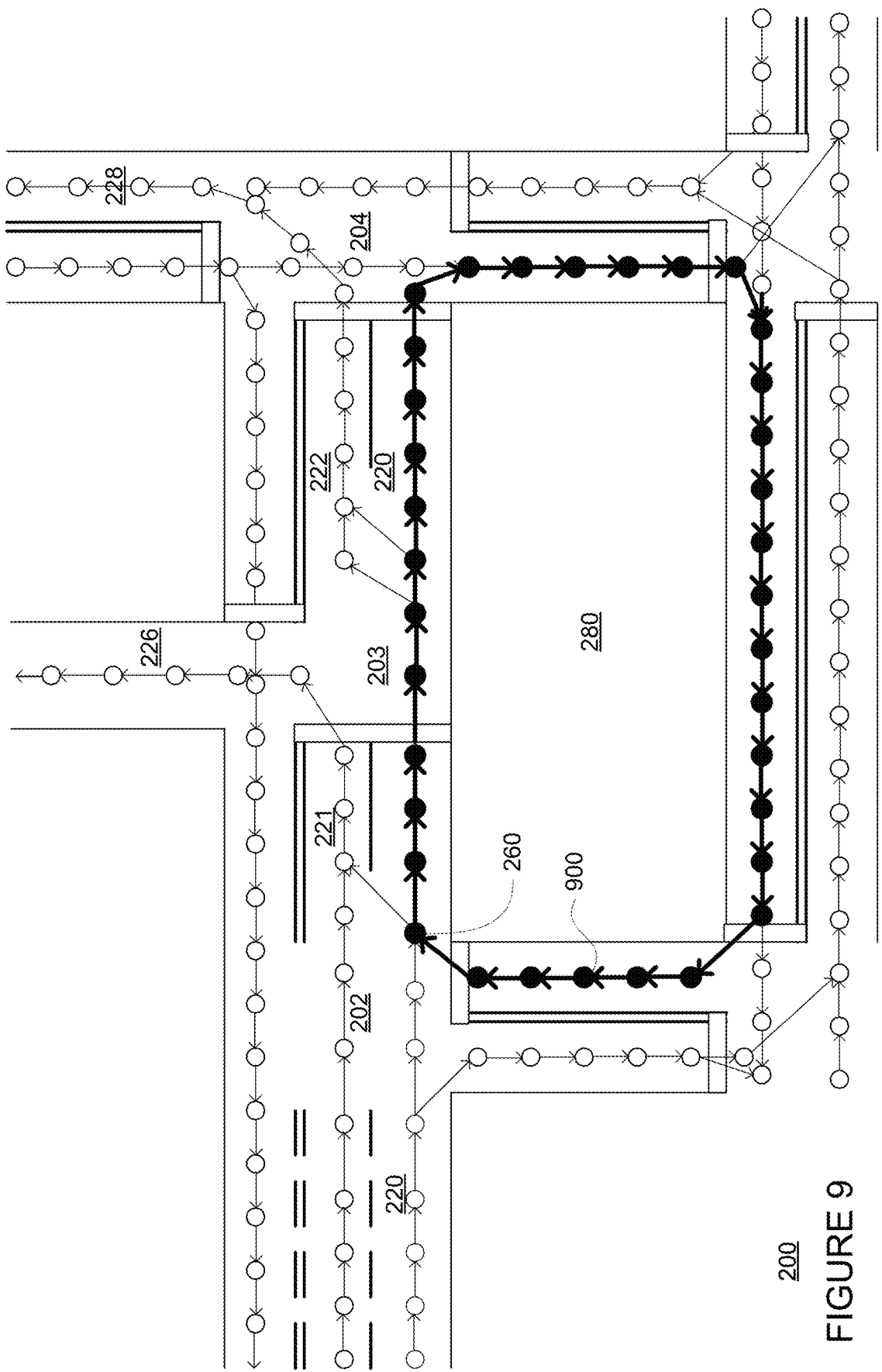
FIG. 9 is an example representation of overlapping nodes and edges between a new route and tracked nodes and edges in accordance with aspects of the disclosure.

Returning to FIG. 11, at block 1130, locations of the route are compared to the tracked location to determine an overlap value. Each time the routing system publishes a new route, the nodes and edges of that new route may be compared to the tracked list of nodes and edges of the route history. In this regard, the routing system may perform an iterative search comparing the nodes and edges of the new route to those of the route history in order to identify which nodes and edges overlap or are the same. In this regard, the routing system 166 may identify a number of overlapping nodes and/or a number of overlapping edges for each new route. In some instances, the edges may give a stronger more accurate signal than the nodes themselves, but nodes may also be used. For example, the routing system may compare tracked nodes and edges 800 of FIG. 8 to the nodes and edges of the route 700. FIG. 9 depicts the overlapping nodes and edges 900 between a new route (here, route 700) and the tracked nodes and edges in black. In this example, the overlap value may be 35 corresponding to the number of overlapping nodes or overlapping edges.

Returning to FIG. 11, at block 1140, whether the vehicle is in a loop is determined based on the overlap value. The number of overlapping nodes and/or the number of overlapping edges may be compared to a first threshold value. This comparison may be used to determine whether the amount of overlap is a meaningful one that suggests that the vehicle is in a loop. As an example, this overlap may be a value corresponding to a number of nodes or edges. Of course, the threshold value may depend upon how closely the nodes are arranged, the length of the edges, and/or the positioning of the nodes and/or edges.

For instance, a threshold may include a minimum of 3 matching nodes and 2 consecutive edges. As an example, a route history may include a series of nodes Z, A, B, C, E as well as the edges between these nodes. This may be compared to a series of nodes Y, A, B, C, F as well as the edges between these nodes. In this example, the first and fifth nodes (Z and Y as well as E and F) not matching exactly, there is an overlap of nodes A, B, and C as well as the consecutive edges between nodes A and B and between nodes B and C. As this example includes 3 matching nodes and 2 consecutive edges, this may be a positive detection of a loop. As another example, a route history may include a series of nodes A, B, C, D, E as well as the edges between these nodes. This may be compared to a series of nodes A, B, F, D, E as well as the edges between these nodes. In this example, the first and fifth nodes (A and A as well as E and E) match exactly; however, because these are not consecutive edges, this may not be a positive detection of a loop.

Returning to the example of FIG. 9, the overlap value of 35 indicating there are 35 overlapping nodes and/or 35 overlapping edges may be greater than the first threshold value or significant enough to indicate that the vehicle 100 is in fact in a loop. There is of course a tradeoff between the number of nodes or edges needed to match and the ability to detect loops.

If the vehicle is determined to be within a loop, a mitigation response may be initiated. In this way, the vehicle is able to exit or avoid a loop before actually becoming stuck in the loop thereby improving the experience of any passengers in the vehicle and improving the vehicle 100's ability to reach the destination.

The mitigation response that is initiated may depend upon where the vehicle is relative to its destination. For example, if a vehicle is within a predetermined distance, in time or space, from the destination, such as 100 meters along the current route, the vehicle may automatically set a new destination to the vehicle's current location. By doing so, the vehicle may be able to exit the loop and may end up stopping very close to the initial destination, which may be for example, a pick up or drop off location for passengers or cargo.

If the vehicle is beyond the predetermined distance, the cost for traversing the overlapping edges or nodes may be increased and the routing system may attempt to determine another new route. At this point, the prior new route becomes a "prior" route. This may reduce the likelihood that the new route will include the loop. If it does, the costs may be increased (for instance by adding a fixed amount or by multiplying by some constant) for the next iteration of the routing system until the new route does not include the loop. In addition, in some instances when threshold value is met and the vehicle is beyond the predetermined distance, the vehicle may automatically be connected to a remote assistance operator who can monitor the vehicle to ensure that the vehicle is able to exit the loop.

The computing devices 110 may then determine whether the new route includes the loop or rather, whether the new route will allow the vehicle to exit the loop. In this regard, the loop may be the overlapping nodes and/or edges of the first overlap between the prior route and the route history. A second overlap may be determined by comparing the nodes and edges of the first overlap to the nodes and edges of the new route. The computing devices 110 may then determine how much or what percentage of the nodes and edges of the first overlap are included in the new route, for example by dividing the number of nodes and/or edges in the second overlap by the number of nodes and/or edges in the first overlap. If this percentage is less than a second threshold value, such as 0.75 or 75% or more or less, the vehicle may be able to exit the loop using the new route. In this regard, the new route may be input into the planning system 168 and used to determine trajectories for the vehicle to follow as described above.

Figure 10:
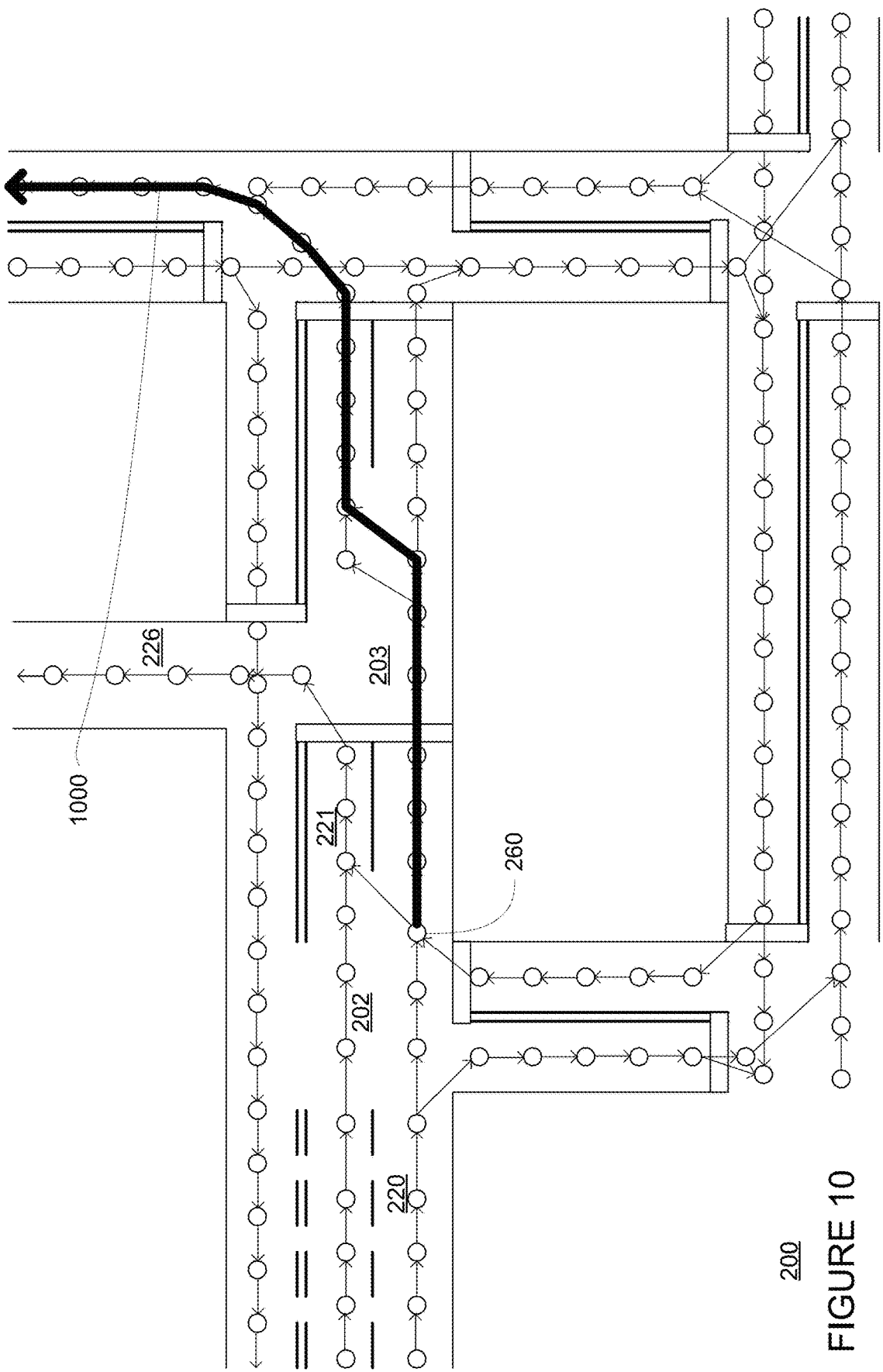
FIG. 10 is another example of a portion of a route and map information in accordance with aspects of the disclosure.

For example, assuming in the example of FIGS. 6-9, the vehicle is beyond the predetermined distance, once the computing devices 110 have determined that the vehicle is within a loop, when determining a new route, the overlapping nodes and edges 900 may be giving a greater cost. In this regard, as depicted in FIG. 10, rather than endlessly being caught in a loop including the overlapping nodes and edges 900 (i.e. a first overlap), the routing system 166 may determine a new route 1000 (only a portion of the new route 1000 being depicted in FIG. 10). The percentage of overlap between the new route 1000 and the overlapping nodes and edges 900 may be determined and compared to the threshold value. In this example, there are 7 overlapping nodes and 6 overlapping edges between the new route 1000 and the overlapping nodes and edges 9000, corresponding to 20% percent of overlap and 17% percent of overlap, respectively. As the overlap percentages are less than the second threshold value, here 75%, the new route may be determined to take the vehicle out of the loop. Alternatively, if all edges are assumed to be 1 meter, the same percentages of overlap would be determined. In this example, the new route 1000 take the vehicle out of the loop, for example, by causing the vehicle to change from lane 220 to lane 222 and make a left turn into lane 228 at intersection 204 and towards the destination (not shown).

If the vehicle is not able to exit the loop, for example, there is still an overlap that meets the second threshold value (i.e. there is still too much overlap), as noted above, in some instances, another iteration of increasing the cost for traversing the overlapping edges or nodes and determining another new route may be performed. The percentage of overlap between the new route (a third overlap) and the loop (the first overlap) may be determined and used to determine whether the vehicle is able to exit the loop as described above.

If the vehicle is not able to exit the loop after a predetermined number of iterations, such as one or more iterations, the vehicle may automatically connect to a remote assistance operator. For example, if the vehicle is unable to make the left turn at intersection 204 and exit the loop, the vehicle may automatically connect to a remote assistance operator, such as user 442, via a computing device, such as client computing device 440, and over a network, such as network 460. The remote assistance operator may enable the vehicle to take certain actions (such as to drive over debris) or may provide the vehicle with a new destination (such as its current location, in order to cause the vehicle to pull over immediately).

In some instances, that a vehicle was in a loop as well as other information, such as whether a vehicle is able to exit the loop may be logged. This logged data may then be used offline, for example by the server computing devices 410, in order to improve the vehicle's software. For example, detecting a loop may suggest that there is an underlying issue with the vehicle's software, such as the failure to complete certain types of maneuvers, such as lane changes, unprotected turns, etc. whether or not at certain specific or types of locations. In this regard, in some instances, the rate at which vehicles are in loops because of certain types of maneuvers may be used as a guide to direct future improvements to the software for instance to run simulations, etc.

The features described herein may provide for a useful and practical approach to detecting and responding to loops. By detecting loops as described herein, they can be resolved, providing for a smoother trip which avoids wasting resources and improves the user experience.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject

The invention claimed is:

1. A method comprising:
   generating, by one or more processors, a route from a current location of a vehicle to a destination for a trip;
   controlling, by the one or more processors, the vehicle in an autonomous driving mode based on the route;
   while controlling the vehicle, tracking, by the one or more processors, locations traversed by the vehicle;
   comparing, by the one or more processors, locations of the route to the tracked locations to determine an overlap value; and
   determining, by the one or more processors, whether the vehicle is in a loop based on the overlap value.

2. The method of claim 1, wherein generating the route includes using a roadgraph including nodes representing locations and edges representing connections between nodes, the tracked locations include a first plurality of nodes of the roadgraph, the locations of the route include a second plurality of nodes of the roadgraph, and the overlap value identifies a number of nodes that overlap between the first plurality of nodes and the second plurality of nodes.

3. The method of claim 2, wherein the comparing includes comparing the number of nodes that overlap to a threshold value.

4. The method of claim 1, wherein generating the route includes using a roadgraph including nodes representing locations and edges representing connections between nodes, and the tracked locations include a first plurality of edges of the roadgraph, the locations of the route include a second plurality of edges of the roadgraph, and the overlap value identifies a number of edges that overlap between the first plurality of edges and the second plurality of edges.

5. The method of claim 4, wherein the comparing includes comparing the number of edges that overlap to a threshold value.

6. The method of claim 1, wherein the tracking for the trip begins in response to setting a new destination for the vehicle.

7. The method of claim 1, wherein the tracking for the trip begins in response to a transition between a manual driving mode and the autonomous driving mode for the vehicle.

8. The method of claim 1, further comprising, when the vehicle is determined to be in a loop, determining a mitigation response.

9. The method of claim 8, wherein determining the mitigation response is based on whether the vehicle is within a predetermined distance from the destination.

10. The method of claim 8, wherein the mitigation response includes connecting the vehicle with a remote assistance operator.

11. The method of claim 8, wherein the mitigation response includes setting a new destination for the vehicle.

12. The method of claim 11, wherein the new destination is a current location of the vehicle.

13. The method of claim 8, wherein the mitigation response includes:
    increasing costs of overlapping locations between the tracked locations and the locations of the route; and
    computing a new route to the destination using the increased costs.

14. The method of claim 8, wherein generating the route includes using a roadgraph including nodes representing locations and edges representing connections between nodes, and the tracked locations include a first plurality of edges of the roadgraph, the locations of the route include a second plurality of edges of the roadgraph, and comparing the locations of the route to the tracked location includes identifying a set of overlapping edges between the first plurality of edges and the second plurality of edges, and the method further comprises:
    increasing costs of the set of overlapping edges; and
    computing a new route to the destination using the increased costs.

15. The method of claim 14, further comprising, determining whether the vehicle is able to exit the loop by determining an overlap between the new route and the set of overlapping edges.

16. The method of claim 15, further comprising:
    when the vehicle is determined not to be able to exit the loop, further increasing costs of the set of overlapping edges; and
    computing another new route to the destination using the further increased costs.

17. The method of claim 15, further comprising when the vehicle is determined not to be able to exit the loop, sending a request for remote assistance.

18. The method of claim 8, wherein generating the route includes using a roadgraph including a nodes representing locations and edges representing connections between nodes, and the tracked locations include a first plurality of nodes of the roadgraph, the locations of the route include a second plurality of nodes of the roadgraph, and comparing the locations of the route to the tracked location includes identifying a set of overlapping nodes between the first plurality of nodes and the second plurality of nodes, and the method further comprises:
    increasing costs of the set of overlapping nodes; and
    computing a new route to the destination using the increased costs.

19. The method of claim 18, further comprising, determining whether the vehicle is able to exit the loop by determining an overlap between the new route and the set of overlapping nodes.

20. The method of claim 19, further comprising:
    when the vehicle is determined not to be able to exit the loop, further increasing costs of the set of overlapping nodes; and
    computing another new route to the destination using the further increased costs.

21. The method of claim 19, further comprising, when the vehicle is determined not to be able to exit the loop, sending a request for remote assistance.

* * * * *